June 22, 1943.   W. L. FISCHER   2,322,231
OPTICAL AMPLIFIER
Filed Aug. 14, 1940   2 Sheets-Sheet 1
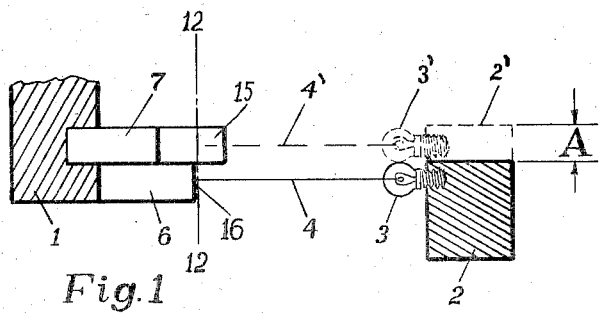
Fig.1
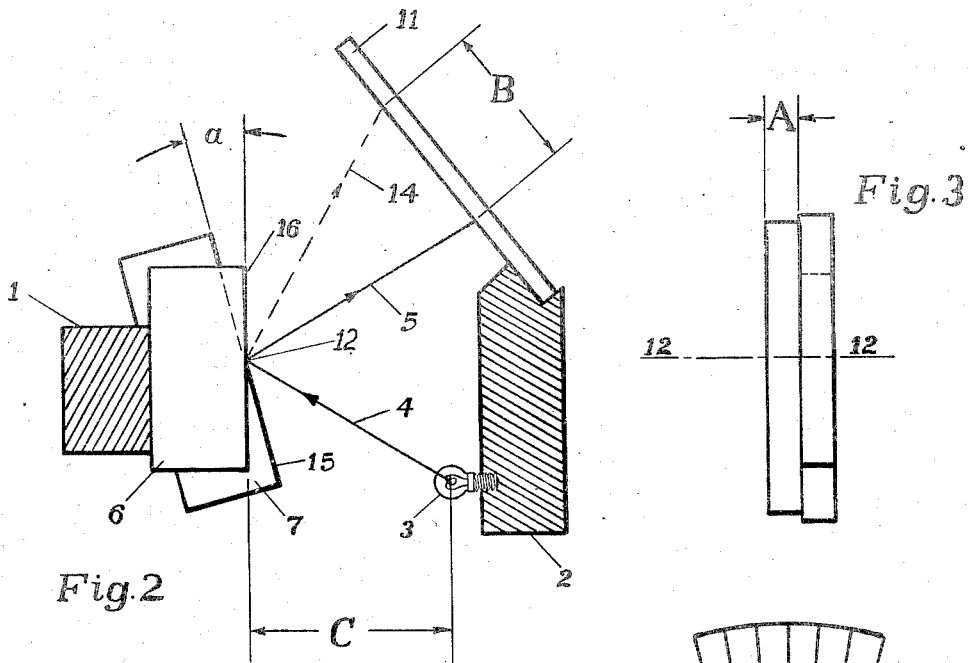
Fig.2
Fig.3
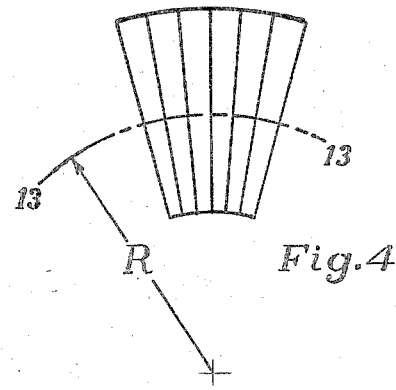
Fig.4
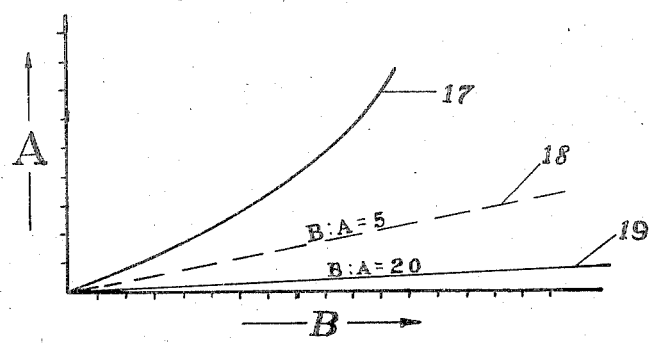
Fig.5
INVENTOR
William L. Fischer
BY
ATTORNEY June 22, 1943.　　　W. L. FISCHER　　　2,322,231
OPTICAL AMPLIFIER
Filed Aug. 14, 1940　　　2 Sheets-Sheet 2

Inventor
WILLIAM L. FISCHER
Attorney

Patented June 22, 1943

2,322,231

UNITED STATES PATENT OFFICE 2,322,231

OPTICAL AMPLIFIER

William L. Fischer, Philadelphia, Pa.

Application August 14, 1940, Serial No. 352,526

8 Claims. (Cl. 88—74)

(Granted under the act of March 3, 1883, as amended April 30, 1928; 370 O. G. 757)

This invention relates to a new and useful device for optically amplifying small relative movements of bodies.

Optical amplifiers are used for the measurement of very small displacements or movements of one body relative to another. This is the case, for example, in instruments designed to measure the change in pressure in the cylinder of a steam engine, an internal combustion engine or an air compressor, such instruments being known as "indicators." It is also the case in instruments known as "vibrographs" or "torsiographs" and designed to record the linear or torsional vibrations in a structure.

Conventional optical amplifiers consist basically of a light source, emitting a ray of light, and a light-screen or film, both carried on one of two relatively movable bodies, of a plain mirror pivotally mounted on the other of said bodies, and a mechanical linkage connecting the pivotally mounted mirror with the first mentioned body in such a manner that relative movement of the bodies will cause the mirror to be turned on its pivot through an angle proportional to the magnitude of the movement. Thus the ray of light will be reflected through a different angle for each relative position of the two bodies and an amplified record of the relative movement of the bodies will be formed on the film.

These conventional optical amplifiers are fairly satisfactory as long as the relative movement between the bodies is slow enough as not to affect the mechanical linkage either functionally or structurally, though even at these speeds these devices are subject to errors due to play in the linkage. However, if the relative movement is very rapid, as is the case with regard to indicators and torsiographs for high speed internal combustion engines, the mechanical linkage cannot function properly, if at all, due to errors introduced by inertia, friction, play in joints, elongation and other causes.

It is an object of this invention to provide an optical amplifier which will accurately measure small relative movements of bodies over a wide range of speeds and the accuracy of which is not impaired by high speeds of such movements.

It is a further object of this invention to provide an optical amplifier which is simple in construction, will not require recalibration and has no moving parts connected with the light source or mirror.

It is a still further object of this invention to provide an optical amplifier which requires no mechanical connection between the two bodies, the relative movement of which is to be measured.

Reference may now be had to the accompanying drawings, in which:

Fig. 1 is a plan view, partly in section, of one embodiment of the invention;

Fig. 2 is a side elevational view, partly in section, of the amplifier a portion of which is shown in Fig. 1;

Fig. 3 is a front elevational view of a laminated mirror of the type shown in Figs. 1 and 2.

Fig. 4 is a front elevational view of a laminated mirror built up of tapered laminations; and Fig. 5 is a graph illustrating various amplification ratios which may be used.

Figure 7:
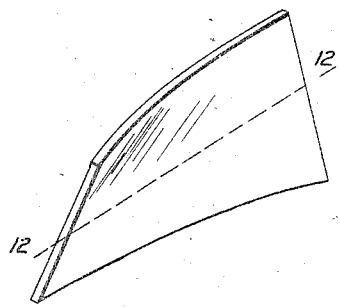
Fig. 7 is a perspective view of a mirror embodying the invention made from a sheet of metal or other reflective material.

The basic idea of this invention is the use of a mirror which is rigidly attached to one of the two bodies, the relative movement of which is to be measured, and is so shaped as to reflect a ray of light emanating from the other of said bodies back to a screen or film carried by the latter body, while progressively changing the angle through which the ray is reflected as relative movement continues in a given direction.

In the drawings, the reference numeral 1 indicates one of a pair of relatively movable bodies, the other being indicated by 2. It is desired to measure the relative movements of these bodies along a line such as 12—12 in Figures 2 and 3. The trace of this line also appears at 12 in Figure 2.

The body 2 carries a light source 3 and a light screen or photographic film 11. The body 1 has rigidly attached thereto a mirror which is shown as being built up of thin plates or laminations 6 and 7 which are mounted to present their edges 16, 15 respectively to the ray of light emanating from the light source 3. These edges 16, 15 are polished until they become highly reflecting. Preferably very thin plates or laminations are used, for example, of a thickness of .002 inch. The material may be stainless steel. To avoid complicating the drawing the number of laminations shown in Figs. 1, 2 and 3 has been restricted to two. Also in the interest of clarity the thickness of the laminations has been greatly exaggerated in the drawings.

The light from source 3 will normally be concentrated into a fine beam or ray which, when the bodies are at rest, will fall as a point of light on the reflecting edge of one of the laminations of the mirror. The ray will be so directed as to fall along the line of intersection of the planes containing the edges of the laminations. The light source will be provided with conventional means for concentrating and directing the ray of light, such as a reflector behind the light and a concentrating lens between the light source and the spot on which it is desired to have the ray impinge. These accessories have not been illustrated since they are conventional.

In Figs. 1 and 2 the ray of light 4 is shown impinging on the polished edge 16 of the lamination 6 when the bodies are at rest. From this point it is reflected back along the line 5 to the film or screen 11. Now, if body 2 moves from its solid line position in Fig. 1 to its dotted line position through the distance A, which is equal to the lamination thickness the ray of light from source 3 will be displaced to the position 4' and will impinge upon the polished edge 15 of lamination 7. From thence it will be reflected back to the film along the line 14 of Fig. 2.

Thus in the course of a relative movement of the bodies through the small distance A the point of impact of the reflected ray on the film or screen 11 will be shifted through the larger distance B. The amplification which this instrument will produce is represented by the ratio of B to A.

As has been stated several conventional elements which would be found in an instrument of this type have been omitted from the drawings for the sake of clarity. In addition to the lens and reflector mentioned above, a similar lens would be used to reconcentrate the beam of light reflected from the mirror prior to its impact on the film or screen. If a film is used at 11 there must be provided some means of moving it if the rate of relative movement is desired or if the direction of relative movement changes enough to have a component in a reverse direction to the original movement.

As long as the movement of the bodies which it is desired to measure occurs along a straight line as in a vibrograph, then the intersection of the planes containing the polished edges of the laminations must occur along a straight line parallel to the line of movement such as the line 12—12 in Fig. 3. This is necessary in order to keep constant the distance between the light source and that part of the polished edge on which the focused ray will impinge, so that the light ray will be correctly focussed along these edges. It is further necessary in order to maintain constant the perpendicular distance between the surface of the film or screen 11 and the point of impingement of the incident ray on the reflecting means.

Figure 6:
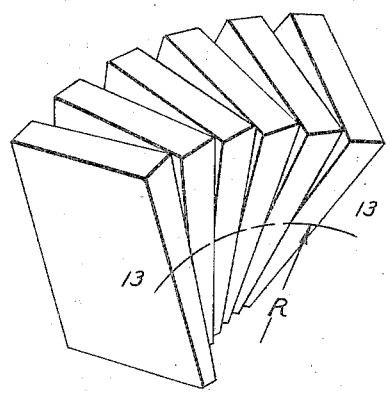
Fig. 6 is a perspective view of the mirror shown in Fig. 4.

However, if the mirror is used in an instrument in which the relative movement of the bodies takes place along an arc, the laminations must be made from tapered stock, as illustrated in Figs. 4 and 6, and must be assembled so that the planes containing the various mirror edges will intersect along an arc as indicated by arc 13—13 of Figs. 4 and 6. In the case of a torsiograph this arc is a part of a circle. Besides the straight line and the circle, which of course are the most common lines of mechanical movement, other curves could, if necessary, be used in the design of the mirror.

From Fig. 2 it is evident that the amplification ratio B:A can be varied by varying the angle $a$ between the mirror edges of adjacent laminations and the distance between the film or screen 11 and the line of intersection 12—12. The amplification could be made a constant, for example 5, as illustrated by the straight line 18 in the graph of Fig. 5 or it could be equal to 20 as illustrated by the straight line 19 in the same graph. But the magnification ratio could also be made to vary with the lamination thickness A. This depends on the choice of the angles $a$ between adjacent laminations. Instead of making B equal to a constant times A the angles $a$ could be selected so as to produce a magnification ratio which varies, for example, with the logarithm of A. In other words, B would equal a constant times log A. Such a varying ratio could be used if it were desired to secure a photographic record of the relative movements of two bodies on a logarithmic scale. There may be other relationships between B and A which it may be desirable to incorporate into the amplifier, and it is obvious that such requirements could be met.

Figure 8:
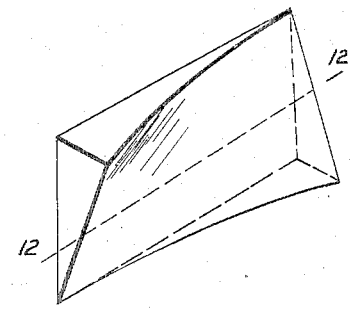
Fig. 8 is a perspective view of a mirror formed on the face of a block of reflecting material.

So far the mirror has been shown and described as made from an assemblage of thin plates or laminations. While this is probably the most practical way to make the mirror in view of its great inherent flexibility of design, it is of course not the only way the mirror can be made. It can, for example, be made by forming a polished sheet as shown in Fig. 7 or by machining and grinding the particular required surface on a solid block as shown in Fig. 8. Basically the mirror could be made from metal or glass or from a combination of metal and glass such as evaporated aluminum deposited on a glass base. Likewise the reflecting surface of a glass prism could be so shaped as to give the optical effect described above with respect to the laminated mirror.

It is essential to the accurate use of the device that the plane containing the incident and reflection rays of light move parallel to itself through successive parallel positions as the body 2 moves relative to body 1, and it is desirable that it be maintained perpendicular to the surface of the screen or moving film 11. In other words, the time ordinate of the film record must be entirely a function of the film speed and must not be permitted to be affected by side deviations of the reflected ray of light.

To those skilled in the art, it will be evident from a study of the foregoing specification and the accompanying drawings, that various modifications can be made in the proportions, the details and the various embodiments of this invention without deviating from the nature and scope of my invention as defined in the appended claims.

The invention described herein may be manufactured and/or used by or for the Government of the United States of America for governmental purposes with the payment of any royalties thereon or therefor.

Having thus set forth and disclosed the nature of my invention, what I claim is:

1. An optical amplifier for recording the relative movements of two solid bodies comprising means for emitting a ray of light and a light receiving means adapted to indicate the reception of light thereon both carried by one of said bodies, and a mirror for receiving said ray of light and reflecting it to said receiving means, said mirror being rigidly mounted on the other of said bodies, said mirror comprising a stack of thin plates, each of said plates having a light reflecting edge so positioned as to receive said ray of light when said bodies occupy a predetermined relative position, said plates being so stacked that each of said reflecting edges lies at a different angle to the surface of said receiving means and the planes containing said reflecting edges all intersect along a line which is the locus of possible points of impact of said ray of light for a predetermined range of relative movement of said bodies, the angles between the reflecting edges of adjacent plates having a constant and predetermined value.

2. An optical amplifier for recording the relative movements of two solid bodies comprising means for emitting a ray of light and a light receiving means adapted to indicate the reception of light thereon both carried by one of said bodies, and a mirror for receiving said ray of light and reflecting it to said receiving means, said mirror being rigidly mounted on the other of said bodies, said mirror comprising a stack of thin plates, each of said plates having a light reflecting edge so positioned as to receive said ray of light when said bodies occupy a predetermined relative position, said plates being so stacked that each of said reflecting edges lies at a different angle to the surface of said receiving means and that when considering said plates in order from one end of said stack said angular differences follow a predetermined mathematical function, the planes containing said reflecting edges all intersecting along a line which is the locus of possible points of impact of said ray of light for a predetermined range of relative movement of said bodies.

3. An optical amplifier for recording the relative movements of two solid bodies, comprising means for emitting a ray of light and a light receiving means adapted to indicate the reception of light thereon both carried by one of said bodies, and a mirror for receiving said ray of light and reflecting it to said receiving means, said mirror being rigidly mounted on the other of said bodies, the reflecting surface of said mirror being so shaped that the intersection of the plane containing said emitted and reflected ray of light with the surface of said mirror is a straight line, which as said bodies progressively change their relative positions in a predetermined manner, constantly shifts its angular relation to the surface of said receiving means in accordance with a predetermined law of mathematical function, said shift of angular relation occurring about a line which is the locus of points of impact of said ray on said mirror for said predetermined change of relative position of said bodies.

4. A device for affording an amplified indication of the movement of a body along a predetermined path, comprising a reflecting means carried by said body, stationary means for emitting a ray of light in a direction normal to said path and impinging upon said reflecting means, light receiving means adapted to indicate the reception of light thereon, said reflecting means being so positioned and so shaped as to change the angle of reflection of said ray of light for each change of position of said body and said reflecting means and said receiving means being so positioned that the perpendicular distance between said receiving means and the point of impact of said ray of light on said reflecting means will remain constant throughout the travel of said body.

5. A device for affording an amplified indication of the movement of a body along a predetermined path, comprising a reflecting means carried by said body, stationary means for emitting a ray of light in a direction normal to said path and impinging upon said reflecting means, light receiving means adapted to indicate the reception of light thereon, said reflecting means being so positioned and so shaped as to change the angle of reflection of said ray of light for each change of position of said body through a predetermined increment of change and said reflecting means and said receiving means being so positioned that the perpendicular distance between said receiving means and the point of impact of said ray of light on said reflecting means will remain constant throughout the travel of said body.

6. A device for measuring the relative displacement of one body with respect to another along a predetermined path, comprising a reflecting means carried by one of said bodies, means carried by the other of said bodies to emit a ray of light in a direction normal to said path and impinging upon said reflecting means, light receiving means adapted to indicate the reception of light thereon carried by said other of said bodies, said reflecting means being so positioned and so shaped as to change the angle of reflection of said ray of light for each relative change of position of said two bodies through a predetermined increment of change, while intercepting said ray of light at a constant perpendicular distance from said receiving means throughout the relative travel of said body.

7. A device for measuring the relative displacement of one body with respect to another along a predetermined path, comprising a reflecting means carried by one of said bodies, means carried by the other of said bodies to emit a ray of light in a direction normal to said path and impinging upon said reflecting means, a light receiving means adapted to indicate the reception of light thereon carried by said other of said bodies, said reflecting means having a warped reflecting surface comprising a plurality of straight reflecting elements normal to said path and lying in planes which intersect along a line parallel to said path and so positioned that throughout the relative movement of said bodies said ray of light will be intercepted along said line, said reflecting means being so positioned relative to said receiving means that the perpendicular distance between the point of impact of said ray of light on said reflecting means and the surface of said receiving means will remain constant throughout the relative movement of said bodies.

8. A device for affording an amplified indication of the relative motion of two bodies along a predetermined path comprising means emitting a ray of light in a plane substantially normal to said path and a light receiving means adapted to indicate the reception of light in said plane, both said means carried by one of said bodies, the other of said bodies having a light reflecting surface formed thereon, said surface being so shaped that throughout relative movement of said bodies along said path, said ray will be reflected in parallel planes, the angle between the incident and reflected portions of said ray varying as a function of said relative movement.

WILLIAM L. FISCHER.

CERTIFICATE OF CORRECTION.

Patent No. 2,322,231.   June 22, 1943.

WILLIAM L. FISCHER.

It is hereby certified that error appears in the printed specification of the above numbered patent requiring correction as follows: Page 2, second column, line 60, for the word "with" read --without--; and that the said Letters Patent should be read with this correction therein that the same may conform to the record of the case in the Patent Office.

Signed and sealed this 10th day of October, A. D. 1944.

Henry Van Arsdale (Seal)   Acting Commissioner of Patents.